April 19, 1938.  E. C. EDMONDS  2,114,762
WARNING DEVICE FOR INDICATING OVERHEATED JOURNALS
Filed May 27, 1937
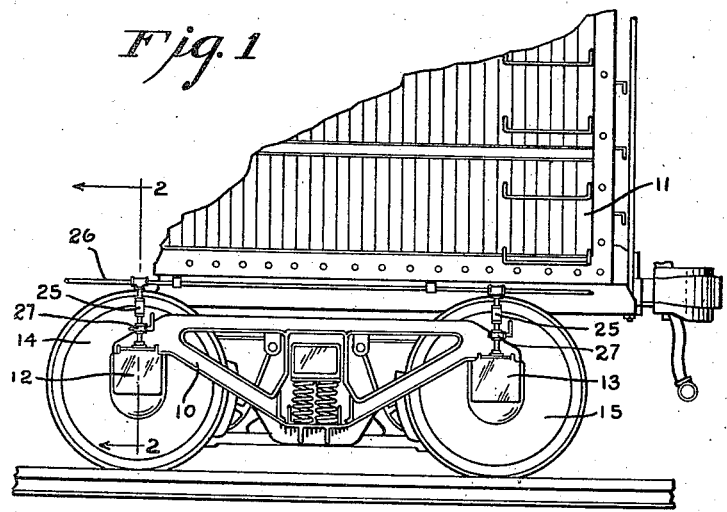
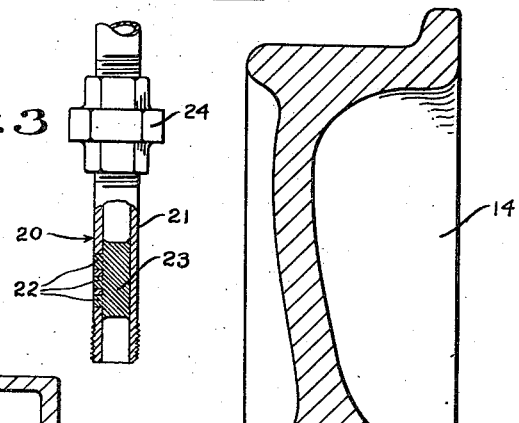
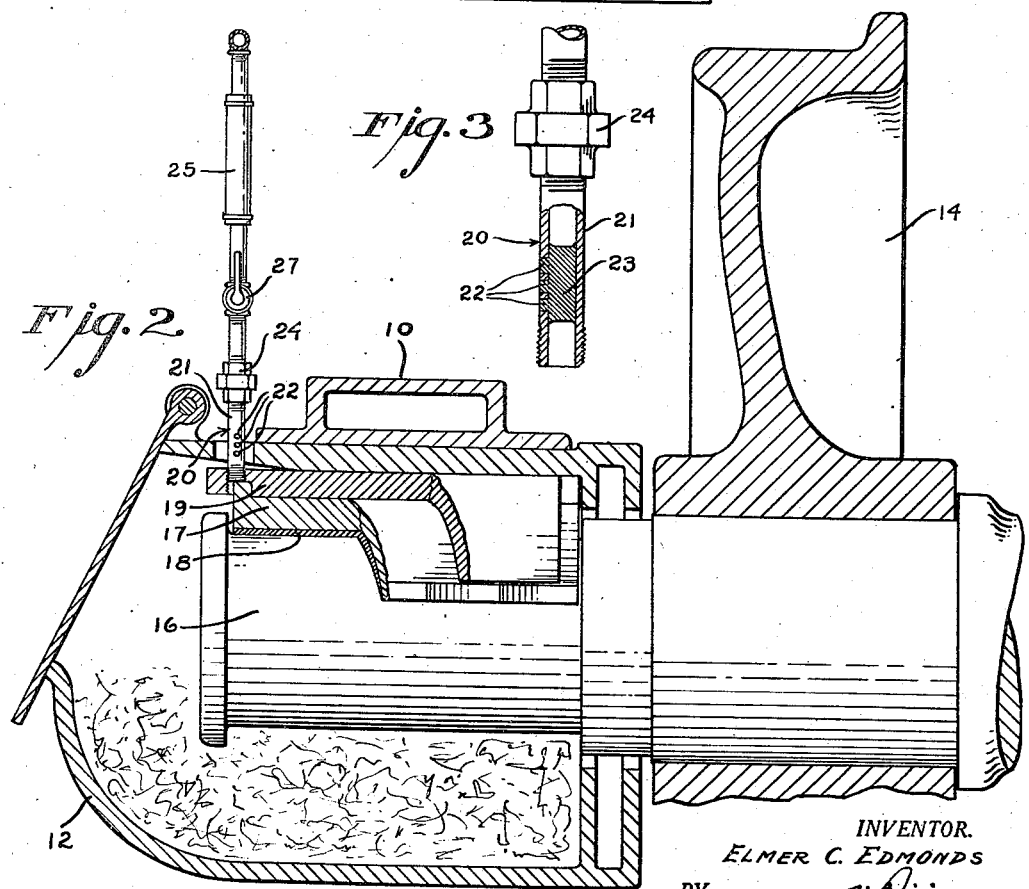
INVENTOR.
ELMER C. EDMONDS
BY Walter H. Rising
ATTORNEY.

Patented Apr. 19, 1938

2,114,762

UNITED STATES PATENT OFFICE 2,114,762

WARNING DEVICE FOR INDICATING OVERHEATED JOURNALS

Elmer C. Edmonds, Lindley, N. Y., assignor of one-half to James Dunning, Corning, N. Y.

Application May 27, 1937, Serial No. 145,082

2 Claims. (Cl. 246—169)

This invention relates to journal assemblies and particularly to journals and journal bearings on railway cars.

The journal bearings of railway cars and particularly those used on passenger trains are subject to a large amount of friction due to the great weight which they support and the speed of rotation of the journal in contact therewith. It often happens that a journal and its bearing will become overheated in service from lack of proper lubrication or breakage from road shock. When this occurs the entire journal assembly becomes so hot that the cotton waste and lubricant contained in the journal box may burst into flames, whence arises the familiar term "hot box". If a hot box is detected soon enough the train may be stopped and the faulty bearing may be remedied or the car removed to a siding. If not detected and remedied the journal and its bearing will become so hot that the bearing will melt or disintegrate and the journal itself will ultimately be twisted off with consequent disaster to the moving train. When a hot box develops the generation of heat accelerates rapidly.

Many serious wrecks of passenger trains and also freight trains have resulted from the undetected and uncorrected development of a hot box en route. Consequently the train crews are under a heavy responsibility to the management to detect hot boxes before they can become serious and special inspectors are required to examine the journal boxes of the cars at various points along the route in order to discover and check the heating of bearings or the faulty lubrication thereof. However under adverse weather conditions such as heavy fog, rain or snow it is difficult for the train crew to detect a hot box en route before disaster occurs.

It is the object of this invention to prevent the train wrecks and other accidents that result from overheated journals.

Another object is to give warning of an overheated journal soon enough to allow the condition to be corrected with minimum expense and loss of time.

The above and other objects may be attained through the agency of the present invention which embodies among its features a heat-actuated air pressure release unit which is located in thermal contact with the journal bearing and is connected with a signal air line carrying compressed air having a signal device adapted to be operated by release of pressure in the air line. The pressure release unit preferably comprises an extension or tube leading from the signal air line and closed with a plug of easily fusible metal or alloy which is located adjacent the journal bearing and is adapted to be melted by a sufficient rise of temperature in the bearing thereby releasing the air pressure in the line. Such a pressure release unit possesses the advantage that it will go into full operation suddenly without any preliminary leakage due to partial operation. It also has the further advantage that the temperature at which the unit will operate may be chosen over a fairly wide range of temperatures through the selection of a metal or alloy as the plug which will melt at the desired temperature. There are a great many known alloys from which to choose.

In order that the invention may more readily be understood reference is had to the accompanying drawing which illustrates but does not limit my invention and in which:

Fig. 1 is a side view of one of the trucks of a railway car showing an air pressure release unit in combination with a signal air line and a journal assembly in accordance with my invention;

Fig. 2 is a vertical sectional view on the line 2—2 of Fig. 1; and

Fig. 3 is an enlarged detail view partly in section of the pressure release unit of Fig. 2.

In the drawing like parts are indicated by like marks of reference. A truck end 10 which carries the weight of a car 11 is mounted upon journal boxes 12 and 13 which are similar in construction and in cooperation with wheels 14 and 15. The journal box 12 (Fig. 2) surrounds and contains a journal 16 of steel which supports the journal box 12 and the truck end 10 through a bearing 17, usually composed of brass having a babbitted bearing face 18, and a bearing wedge 19 of steel which serves to lock the bearing 17 in position. In the lower part of the journal box 12 and beneath the journal 16, space is provided for lubricating means which usually comprises a mass of cotton waste impregnated with heavy oil and in contact with the journal 16, whereby the journal in revolving will be continuously smeared with the oil.

Through an opening provided in the top of the journal box 12 extends a heat-actuated pressure release unit generally designated 20 which at its lower end is attached to the bearing wedge 19, preferably by being screwed into a threaded hole in the wedge. It will be seen that the unit 20 is thus in thermal contact with the bearing 17 and the journal 16, that is, any rise in temperature in the journal or its bearing is transmitted or conducted through the bearing wedge to the unit 20. It will also be apparent that the location of the unit 20 with respect to the journal 16 is not to be limited to that shown but that it may be located in any desirable position which will bring it into thermal contact with the journal 16 or the bearing assembly. In other types of bearings, such as the well known roller bearing, the unit 20 may be located in or attached to any fixed or immovable part of the bearing assembly.

The pressure release unit 20 which is shown in detail in Fig. 3 comprises in the present instance a short length of metal tube 21 having orifices 22 provided in its side wall for the escape of air but normally closed by a plug 23 of easily fusible metal or alloy such as lead, tin, zinc, etc. or alloys thereof. It is to be understood that the form of the pressure-release unit is not limited to the tube shown but may comprise any suitable hollow air conductor which is provided with a fusible metal plug adapted to release air pressure upon melting of the plug as far as the same may fall within the scope of the claims. The unit 20 is provided at its upper end with a union 24 whereby it is connected through a valve 27 and a preferably flexible metal or rubber tube 25 to a signal air line 26.

The signal air line is common to all passenger trains and is a part of the present invention only to the extent that it cooperates in combination with the pressure-release unit 20. This air line is separate from the so-called brake air line and like the latter it extends the length of the train. It is provided with relief valves whereby a member of the train crew can release the air pressure of the line at points remote from the locomotive, each release of pressure acting to operate a signal device in the cab of the locomotive. The pressure in the line is replenished by a compressor located on the locomotive. For the purpose of cooperating in the functioning of the present invention such an air line can easily be installed on all trains.

The operation of my invention is as follows. The rotation of the journal 16 against the bearing surface 18 under normal conditions of lubrication has no effect upon the pressure release unit 20. When the lubricating means fails or for any reason becomes inadequate, heat is immediately generated through friction of the parts. If the faulty condition is maintained, the temperature of the journal and the bearing assembly will constantly rise, the rate of increase depending upon the amount of friction and being proportional thereto. The rise in temperature is communicated to the pressure release unit 20 and, when the melting point of the fusible plug 23 is reached, this will melt and instantly lower the pressure in the air line 26. The engineer, being thereupon informed of the difficulty by the resulting continuous operation of the signal device in the cab of the locomotive, will bring the train to a safe stop with the usual precautionary setting of flags or other signals. The over-heated journal may at once be located by the sound of the air escaping from the orifices of the pressure release unit which has functioned. By closing the valve 27 and disconnecting the union 24 the spent unit 20 may quickly be removed whereupon the journal box 12 may be jacked up in the usual manner to permit inspection and repair or replacement of the journal bearing 17 if necessary and correction of the lubrication fault. Through the timely warning of my device the bearing should be uninjured and a thorough lubrication should suffice to correct the difficulty after which a fresh pressure release unit may be inserted, the valve 27 may be turned on, and the train can resume its course with a minimum loss of time.

It will be apparent that my invention hereinbefore described in its embodiment in a railway car is not limited thereto but may be embodied without substantial change and within the scope of the claims to the journal assemblies of other machines such as line shafts, propeller shafts of ships, motors, stationary engines, etc.

While in the foregoing there has been shown and described the preferred embodiment of my invention, it is to be understood that minor changes in the details of construction, combination, and arrangement of parts can be resorted to without departing from the spirit and scope of the invention as claimed.

What I claim is:—

1. In a railway car the combination of a journal bearing supported by a journal, a bearing wedge in contact with the journal bearing, a metal tube attached by one end to the bearing wedge and having in its sidewall an orifice which is normally closed with a plug of easily fusible metal filling the bore of the tube adjacent the orifice and extending into the orifice, and an air line carrying compressed air connected to the outer end of the metal tube.

2. In a railway car the combination of a journal box containing a journal bearing supported by a journal, a bearing wedge in contact with the journal bearing, a metal tube passing freely through the wall of the journal box, the tube being attached by one end to the bearing wedge and having in its sidewall an orifice which is normally closed with a plug of easily fusible metal filling the bore of the tube adjacent the orifice and extending into the orifice, and an air line carrying compressed air connected to the outer end of the metal tube.

ELMER C. EDMONDS.